United States Patent
Tsuji et al.

(10) Patent No.: US 7,411,579 B2
(45) Date of Patent: Aug. 12, 2008

(54) INFORMATION PROCESSING APPARATUS HAVING FUNCTION OF CHANGING ORIENTATION OF SCREEN IMAGE

(75) Inventors: Hiroyuki Tsuji, Ome (JP); Hajime Gushiken, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 698 days.

(21) Appl. No.: 10/938,725

(22) Filed: Sep. 13, 2004

(65) Prior Publication Data

US 2005/0062715 A1   Mar. 24, 2005

(30) Foreign Application Priority Data

Sep. 19, 2003   (JP)   ............... 2003-327692

(51) Int. Cl.
*G09G 5/08*   (2006.01)
(52) U.S. Cl. .................. 345/158; 345/168; 345/169; 345/905
(58) Field of Classification Search ............ 345/158, 345/168–169, 905
See application file for complete search history.

(56) References Cited

U.S. PATENT DOCUMENTS

| | | | | |
|---|---|---|---|---|
| 5,566,098 A | * | 10/1996 | Lucente et al. | 361/681 |
| 6,658,272 B1 | * | 12/2003 | Lenchik et al. | 455/575.1 |
| 6,798,649 B1 | * | 9/2004 | Olodort et al. | 361/683 |

\* cited by examiner

*Primary Examiner*—Richard Hjerpe
*Assistant Examiner*—Leonid Shapiro
(74) *Attorney, Agent, or Firm*—Pillsbury Winthrop Shaw Pittman, LLP

(57) ABSTRACT

An information processing apparatus includes a housing with a top surface, a keyboard placed on the top surface of the housing, a display unit with a front surface and a rear surface, supported by the housing and rotated between a closed position in which the keyboard is covered and an open position in which the keyboard is exposed, a sensor which senses an angle formed between the front surface of the display unit and the top surface of the housing, and a display device provided in the display unit to display a screen image in one of a first orientation in which a bottom-end portion of the screen image is located toward the housing and a second orientation in which a top-end portion of the screen image is located toward the housing in accordance with the angle sensed by the sensor.

8 Claims, 10 Drawing Sheets

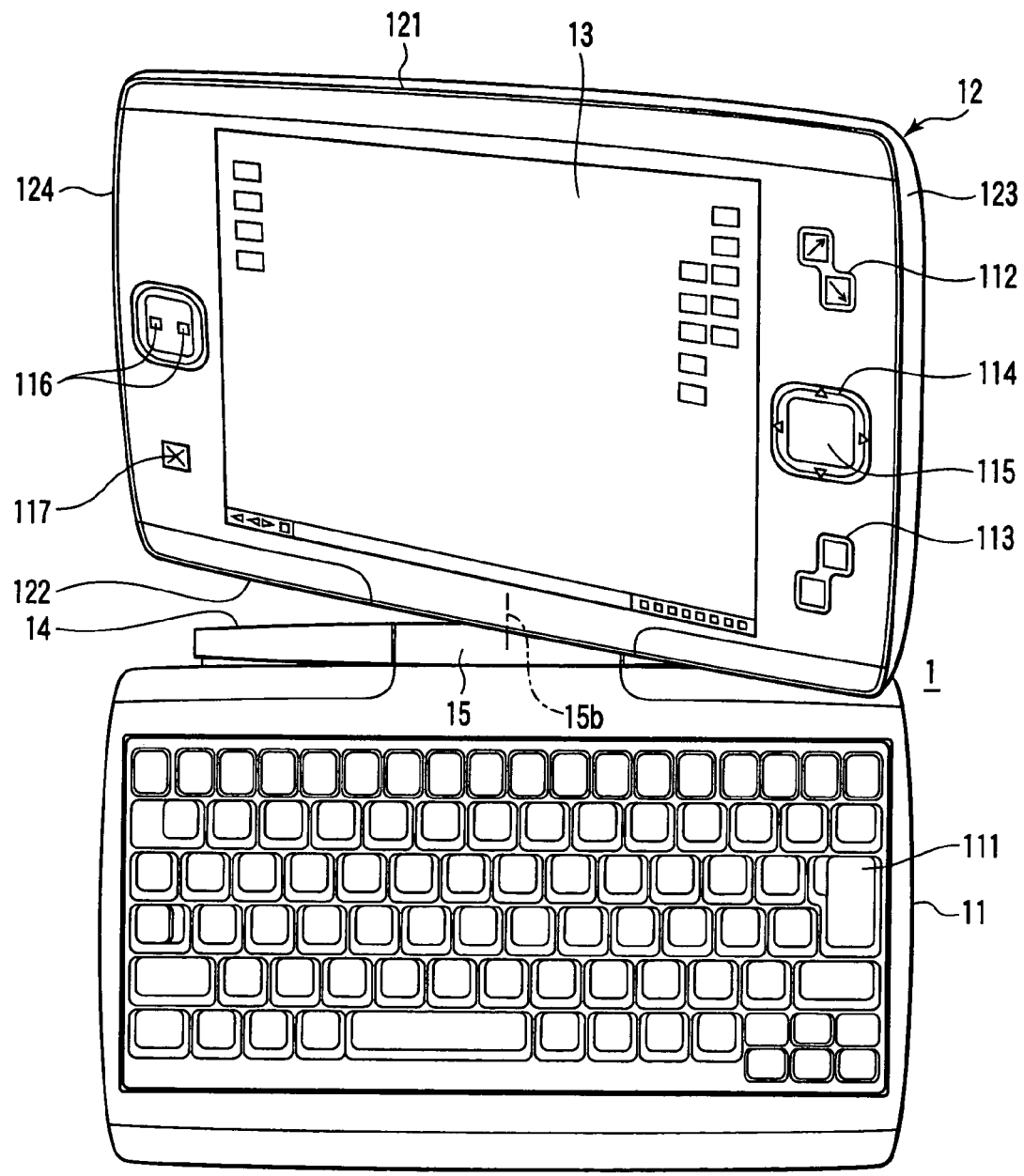
F I G. 2

INFORMATION PROCESSING APPARATUS HAVING FUNCTION OF CHANGING ORIENTATION OF SCREEN IMAGE

CROSS-REFERENCE TO RELATED APPLICATIONS

This application is based upon and claims the benefit of priority from prior Japanese Patent Application No. 2003-327692, filed Sep. 19, 2003, the entire contents of which are incorporated herein by reference.

BACKGROUND OF THE INVENTION

1. Field of the Invention

The present invention relates to an information processing apparatus such as a portable computer.

2. Description of the Related Art

Various portable computers, such as notebook personal computers and hand-held personal computers, have recently been developed. This type of portable computer has a housing with a keyboard on its top surface and a display unit rotatably attached to the housing. While the display unit is open, a user can input information using a keyboard while seeing a display screen of the display unit.

If, however, the user orients the portable computer to the partner who faces the user to let the partner see the display screen, the user cannot operate the keyboard.

Pen-based computers with no keyboards, such as PDA (Personal Digital Assistants), have also recently been developed. Most of the pen-based computers include a housing and a flat panel display built in the housing.

U.S. Pat. No. 5,566,098 discloses a pen-based computer having a function of varying an orientation of a screen image displayed on a display. In this pen-based computer, the orientation of the screen image is varied in response to user's operations of mercury switches or sensing results of the mercury switches.

The technology of the above U.S. Patent is however directed to a pen-based computer including a display unit and a housing that are formed integrally as one component. It does not take into consideration the control of the orientation of a screen image in a portable computer having a housing with a keyboard on its top surface and a display unit rotatably attached to the housing.

BRIEF SUMMARY OF THE INVENTION

According to an embodiment of the present invention, there is provided an information processing apparatus comprising a housing with a top surface, a keyboard placed on the top surface of the housing, a display unit with a front surface and a rear surface, supported by the housing and rotated between a closed position in which the keyboard is covered and an open position in which the keyboard is exposed, a sensor which senses an angle formed between the front surface of the display unit and the top surface of the housing, and a display device provided in the display unit to display a screen image in one of a first orientation in which a bottom-end portion of the screen image is located toward the housing and a second orientation in which a top-end portion of the screen image is located toward the housing in accordance with the angle sensed by the sensor.

According to another embodiment of the present invention, there is provided an information processing apparatus comprising a housing with a top surface, a keyboard placed on the top surface of the housing, a display unit with a rear surface and a front surface in which a display screen is exposed, the display unit being supported by the housing and set in one of a first style which allows the display unit to rotate between a closed position in which the keyboard is covered and a first open position in which the display screen and the keyboard are exposed and a second style in which the rear surface covers the keyboard and the display screen is exposed, an angle sensor which senses an angle formed between the display screen and the top surface of the housing, an orientation sensor which senses an orientation of the display unit relative to force of gravity, a placement position sensor which senses which of the first style and the second style the display unit is set in, means for varying an orientation of a screen image displayed on the display screen between an orientation in which a bottom-end portion of the screen image is located toward the housing and an orientation in which a top-end portion of the screen image is located toward the housing in accordance with the angle sensed by the angle sensor when the placement position sensor senses that the display unit is set in the first style, and for varying the orientation of the screen image to locate the top-end portion of the screen image in a position higher than the bottom-end portion thereof relative to the force of gravity in accordance with the orientation of the display unit sensed by the orientation sensor when the placement position sensor senses that the display unit is set in the second style.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an external view of the information processing apparatus shown in FIG. 1, the display unit of which rotates in a horizontal direction.

DETAILED DESCRIPTION OF THE INVENTION

An embodiment of the present invention will now be described with reference to the accompanying drawings.

Figure 1:
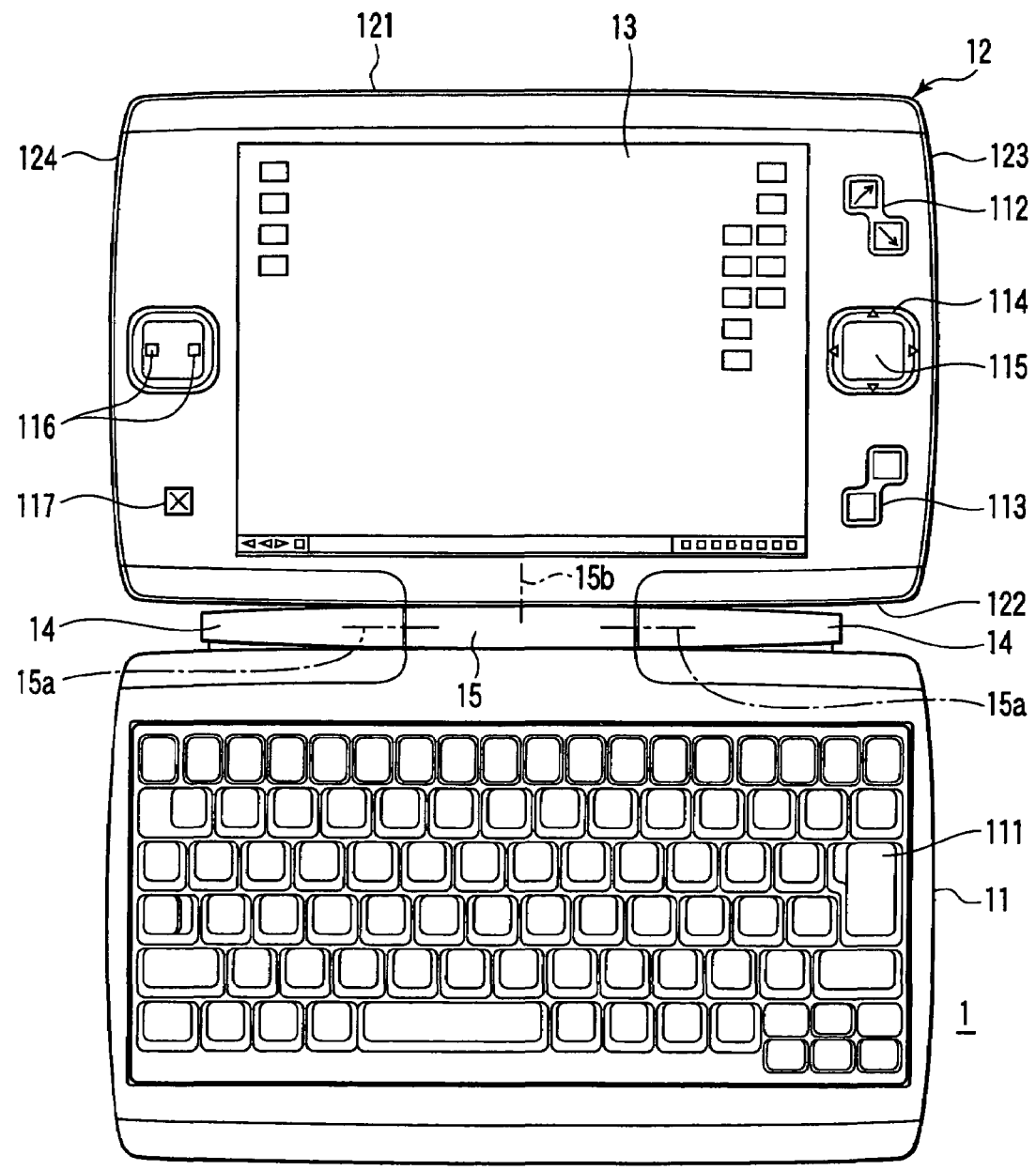
FIG. 1 is an external view of an information processing apparatus according to an embodiment of the present invention.

FIG. 1 shows an outward appearance of an information processing apparatus according to an embodiment of the present invention. The information processing apparatus is implemented as a hand-held portable personal computer 1 that is much smaller than a notebook personal computer.

The portable personal computer 1 includes a computer main body 11 and a display unit 12. The computer main body 11 is configured by a thin, rectangular box-type housing. The housing contains different electronic components that make up a portable personal computer, such as a CPU (Central Processing Unit), a memory, a chip set and a hard disk drive. The housing includes a rectangular case with an opening at the top and a cover joined to the case so as to cover the opening of the case. A keyboard placement area is formed on the top surface of the housing, or the top surface of the computer main body 11. A keyboard 111 is placed on the keyboard placement area. The keyboard 111 is a key set including a plurality of keys (key switches) for inputting key data to the CPU. The computer main body 11 has a pair of hinges 14 at the rear end. The hinges 14 are parts for supporting the display unit 12.

The display unit 12 includes a thin, rectangular display unit main body with a top-end portion 121, a bottom-end portion 122, a right-end portion 123 and a left-end portion 124. A flat panel display unit, e.g., an LCD (Liquid Crystal Display) 13 is provided in the display unit main body. The display unit 12 includes a rear surface and a front surface in which the display screen of the LCD 13 is exposed. The LCD 13 is mounted on the front of the display unit main body such that its display screen can be exposed. The display screen of the LCD 13 is located almost in the center of the display unit 12. The LCD 13 is implemented as a touch screen device that is capable of recognizing a position indicated by a stylus (pen) or a user's finger.

A support member 15 is attached to the center of the bottom-end portion 122 of the display unit main body. The hinges 14 support the support member 15 such that the display unit 12 rotates around a first central axis 15a that extends in parallel to the outer surface of the computer main body 11. Thus, the display unit 12 is supported rotatably between an open position (a first open position shown in FIG. 1) in which the keyboard 111 is exposed and a closed position in which the keyboard 111 is covered. In the open position, the front of the display unit main body cover the entire top surface of the computer main body 11 and the display screen of the LCD 13 are exposed. In the closed position, the front of the display unit main body covers the entire top surface of the computer main body 11.

Figure 5:
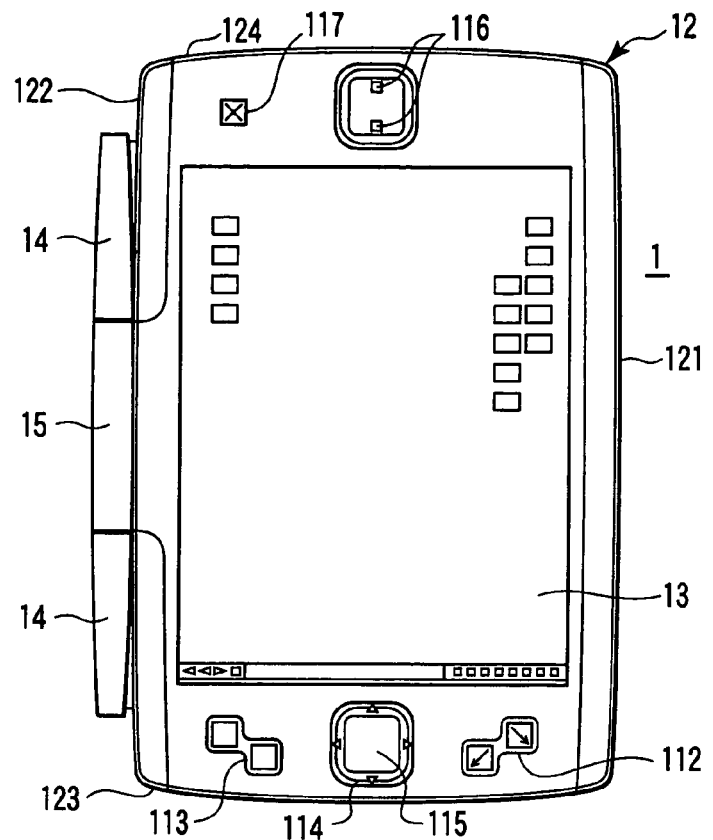
FIG. 5 is a top view of the information processing apparatus shown in FIG. 1, which is set in a PDA style.

The support member 15 supports the display unit main body such that the display unit 12 rotates around a second central axis 15b that extends to the display unit main body from the support member 15 in a direction perpendicular to the first central axis 15a. Thus, the display unit 12 can rotate 360 degrees around the second central axis 15b in a horizontal direction with respect to the outer surface of the computer main body 11, as illustrated in FIG. 2. The display unit 12 rotates 180 degrees around the second central axis 15b in a horizontal direction (the front and rear surfaces of the display unit main body change places) and then is set in the closed position, with the result that it can be placed in the second open position as shown in FIG. 5. In the second open position, the display screen of the LCD 13 is exposed and the rear surface (back) of the display unit main body covers the entire top surface of the computer main body 11.

When the display unit 12 is set in the first open position (FIG. 1), a user can use the computer 1 in the same style as that of a normal notebook personal computer (referred to as a PC style). In this PC style, the user can operate the keyboard 111 while seeing the display screen of the LCD 13. On the other hand, when the display unit 12 is set in the second open position (FIG. 5), the user can use the computer 1 in the same style as that of normal PDA (Personal Digital Associates) with a main body and a display unit built in the main body (hereinafter referred to as a PDA style). In this PDA style, the user can input information with the stylus or operate various key switches provided on the display unit main body.

As shown in FIG. 1, a pair of key switches 112, another pair of key switches 113 and a key switch 114 are arranged on the right front of the display unit main body. The key switches 112 are, for example, push button switches serving as zoom keys for scaling an image (screen image) such as text and graphics displayed on the display screen of the LCD 13. The key switches 113 are, for example, push button switches serving as keys for starting a specific application program. The key switch 114 is a cross key switch including four arrow keys indicating four directions of up, down, right and left. The key switch 114 has a touch panel 115 serving as a pointing device in its inside area.

Further, a pair of key switches 116 and a key switch 117 are arranged on the left front of the display unit main body. The key switches 116 are, for example, push button switches serving as a right button (cancel key) and a left button (enter key) of the pointing device. The key switch 117 is a push button switch serving as an inhibit switch for inhibiting an automatic image rotating function from being fulfilled to automatically vary the orientation of an image displayed on the display screen of the LCD 13. The automatic image rotating function is used to align the orientation of the image with a correct one relative to the force of gravity. When the inhibit switch 17 turns on, it outputs an event signal (e.g., signal of logic level "1") indicative of inhibition of the automatic image rotating function. While the inhibit switch 117 is in on state, the orientation of the image displayed on the display screen of the LCD 13 is not varied whichever orientation the display unit main body rotates relative to the force of gravity. On the other hand, when the inhibit switch 117 turns off, it outputs an event signal (e.g., signal of logic level "0") indicative of permission to perform the automatic image rotating function. While the inhibit switch 117 is in off state, when the display unit main body rotates relative to the force of gravity, the orientation of the image displayed on the display screen of the LCD 13 automatically varies, thus the orientation of the image is aligned with a correct orientation relative to the force of gravity.

Figure 3:
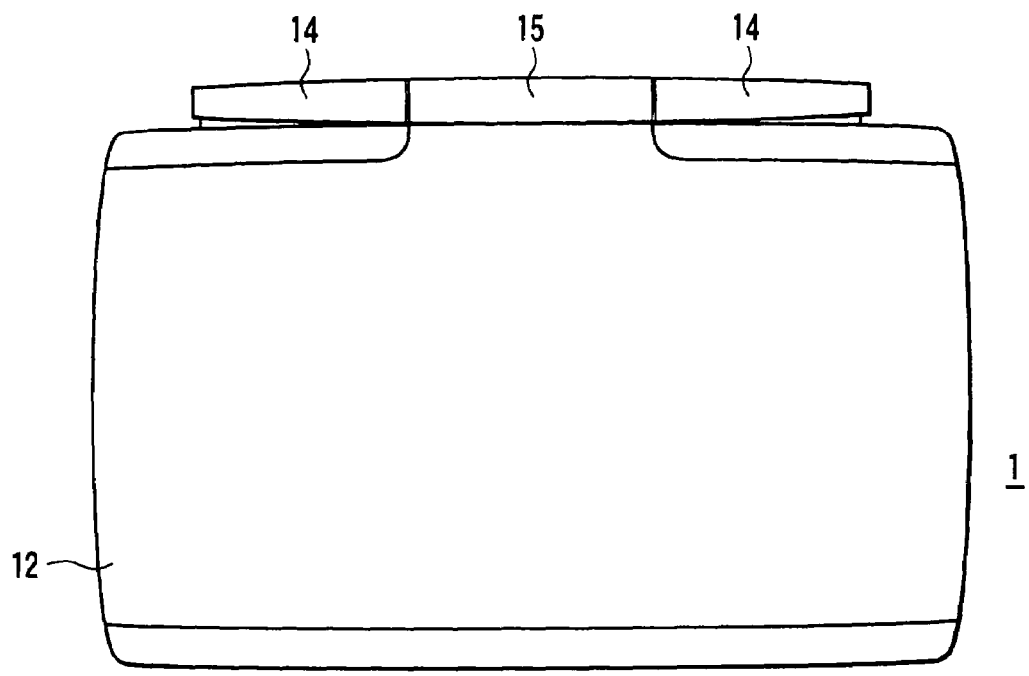
FIG. 3 is a top view of the information processing apparatus shown in FIG. 1, the display unit of which is closed.
Figure 4:
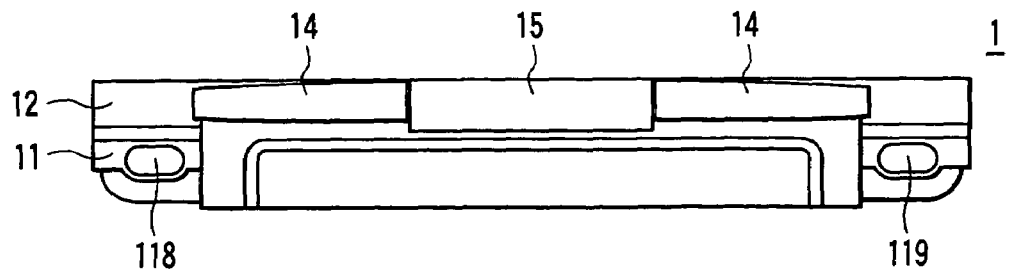
FIG. 4 is a rear view of the information processing apparatus shown in FIG. 1, the display unit of which is closed.

FIG. 3 is a top view of the computer 1 whose display unit main body is located in the closed position. FIG. 4 is a rear view of the computer 1 shown in FIG. 3.

Referring to FIG. 4, two key switches 118 and 119 are arranged on the back of the computer main body 11. The key switch 118 is a push button switch provided on the right-end portion of the back of the computer main body 11 when viewed from the front of the body 11. It is referred to as an R (right) button switch hereinafter. The key switch 119 is a push button switch provided on the left-end portion of the back of the computer main body 11 when viewed from the front of the body 11. It is referred to as an L (left) button hereinafter.

Any given function can programmably be assigned to each of the R and L button switches 118 and 119. In the computer 1, the R and L button switches 118 and 119 serve as key switches for inputting given key data (key code) to the CPU, like the key switches of the keyboard 111. The R and L button switches 118 and 119 are exposed regardless of whether the computer 1 is used in a PC style or a PDA style. In either case, a user can operate both the R and L button switches 118 and 119.

Figure 11:
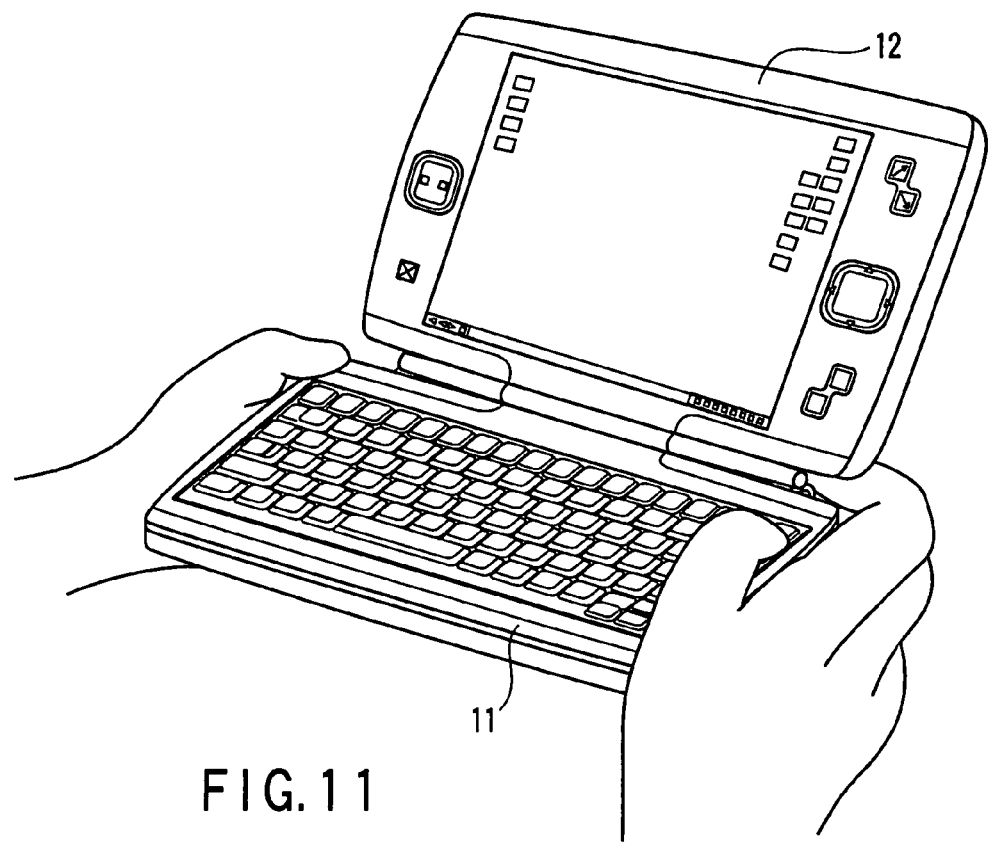
FIG. 11 is an illustration of the information processing apparatus shown in FIG. 1, which is used in a PC style.

The PC style includes a style in which a user puts the computer 1 on a desk or a user's lap and a style in which a user supports the computer 1 with both hands. In the former style, the user can perform a touch-typing operation with both hands. In the latter style as shown in FIG. 11, however, the user has to operate the keyboard 111 chiefly with thumbs. In the PC style, therefore, it is desirable to use both the R and L button switches 118 and 119 as key switches for assisting a user in operating the keyboard 111.

The R and L button switches 118 and 119 are provided on the back of the computer main body 11 as described above. A user can thus operate the keyboard 111 with thumbs while supporting the computer 1 with both hands as shown in FIG. 11 and simultaneously operate the R button switch 118 with, e.g., the right forefinger or the L button switch 119 with, e.g., the left forefinger.

For example, it is favorable that key data corresponding to an auxiliary key used in combination with other keys be assigned to each of the R and L button switches 118 and 119. The keyboard 111 includes a plurality of alphabet keys and a plurality of auxiliary keys (e.g., [Shift] key, [Ctrl] key, [Alt] key). The auxiliary keys are used in combination with (depressed simultaneously with) one or more keys such as the alphabet keys. In the present embodiment, for example, the R button switch 118 serves as a switch for inputting key data corresponding to the [Shift] key, and the L button switch 119 serves as a switch for inputting key data corresponding to the [Ctrl] key. Thus, a user can easily input key data corresponding to the alphabet keys and key data corresponding to the [Shift] key or [Ctrl] key at the same time when he or she performs a typing operation while supporting the computer 1 with both hands.

Another example of favorable key data to be assigned to the R and L button switches 118 and 119 corresponds to an arrow key. The keyboard 111 includes four arrow keys ([↑] key, [↓] key, [→] key and [←] key) corresponding to four directions of up, down, right and left. The [↑] key is an up arrow key for moving up a pointing position on the display screen of the LCD 13, and the [↓] key is a down arrow key for moving down a pointing position on the display screen of the LCD 13. If key data corresponding to the [↓] and [↑] keys are assigned to their respective R and L button switches 118 and 119, they can serve as switches for inputting the key data corresponding to the [↓] and [↑] keys. Consequently, a user can move a pointing position up and down on the display screen and scroll an image displayed thereon up and down by operating the R button switch 118 with the right forefinger and operating the L button switch 119 with the left forefinger while supporting the computer 1 with both hands.

Using dedicated utility programs, a user can previously designate which of the auxiliary keys and the arrow keys are assigned to the R and L button switches 118 and 119.

Figure 12:
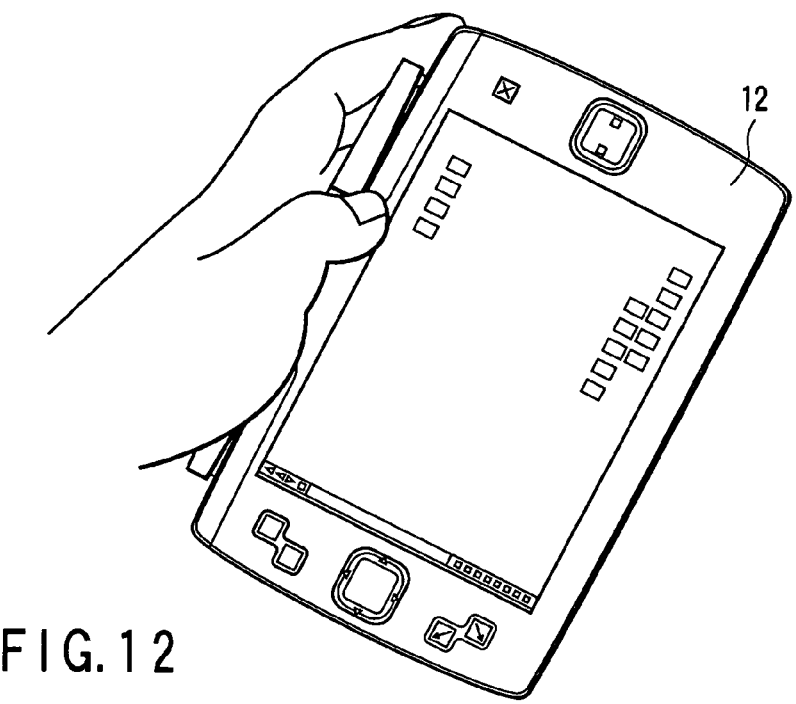
FIG. 12 is an illustration of the information processing apparatus shown in FIG. 1, which is used in a PDA style.

A user can operate both the R and L button switches 118 and 119 in the PDA style as well as in the PC style, as shown in FIG. 12. In the PDA style, the user performs an input operation chiefly with a stylus (pen) because he or she cannot operate the keyboard 11 (the keyboard 111 is covered with the rear surface of the display unit 12). It is therefore favorable that the R and L button switches 118 and 119 be used not for inputting key data to assist a user in operating the keyboard 111 but for assisting a user in performing an input operation with a stylus. In the PDA style, the R button switch 118 serves as a switch for inputting key data corresponding to the left button of the pointing device or key data corresponding to the [Enter] key, and the L button switch 119 serves as a switch for inputting key data corresponding to the right button of the pointing device or key data corresponding to the [Esc] key.

The computer 1 has a key assignment changing function of automatically changing a function assigned to each of the R and L button switches 118 and 119 according to which of the PC style and the PDA style is used for the computer 1. With this function, a key that conforms to a style to use the computer 1 can be assigned to each of the R and L button switches 118 and 119.

There now follows an explanation of an automatic image rotating function.

In the PC style (FIG. 1), a screen image such as text and graphics is set to the orientation (first orientation) in which the bottom-end portion of the screen image is located toward the computer main body 11, more specifically, the top-end portion of the screen image is located toward the top-end portion 121 of the display unit main body and the bottom-end portion of the screen image is located toward the bottom-end portion 122 of the display unit main body. The orientation of the screen image corresponds to that of a default of the image in the PC style.

When the display unit 12 opens 180 degrees or more from the closed position on the top surface of the computer main body 11 relative to the first central axis 15a, the screen image automatically rotates 180 degrees relative to the orientation of a default and its orientation is changed to an orientation (second orientation) in which the top-end portion of the screen image is located toward the computer main body 11 and, more specifically, the top-end portion of the screen image is located toward the bottom-end portion 122 of the display unit main body and the bottom-end portion of the screen image is located toward the top-end portion 121 of the display unit main body. Thus, a user can present the screen image to the partner who faces the user in a correct orientation while maintaining the keyboard 11 in its operable state, with the result that he or she can make a presentation or the like with efficiency.

In the PDA style (FIG. 5), the computer 1 is used in such a manner that the left-end portion 124 of the display unit main body is located above and the right-end portion 123 thereof is located below relative to the force of gravity. Thus, the orientation of the screen image is so controlled that the top-end portion of the screen image is located toward the left-end portion 124 of the display unit main body and the bottom-end portion of the screen image is located toward the right-end portion 123 of the display unit main body. The orientation of the screen image corresponds to that of a default of the image in the PDA style. The aspect ratio of the display screen is changed from the aspect ratio (e.g., length:wide=3:4) corresponding to a horizontally oriented screen used in the PC style to the aspect ratio (e.g., length:wide=4:3) corresponding to a vertically oriented screen.

In the PDA style, the computer 1 is able to rotate in different orientations relative to the force of gravity (FIGS. 5 to 8).

Figure 6:
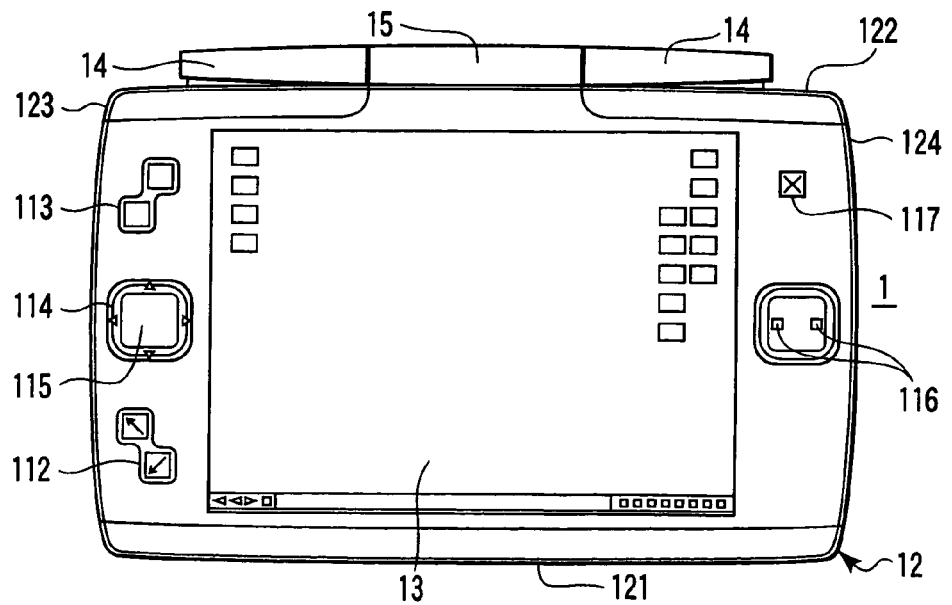
FIG. 6 is a top view of the information processing apparatus shown in FIG. 1, which turns 90 degrees to the right in a PDA style.

FIG. 6 illustrates the computer 1 in which the bottom-end portion 122 of the display unit main body is located above and the top-end portion 121 thereof is located below relative to the force of gravity. A screen image rotates 90 degrees to the left relative to the orientation of a default of the image in the PDA style such that the top-end portion of the screen image is located toward the bottom-end portion 122 of the display unit main body and the bottom-end portion of the screen image is located toward the top-end portion 121 of the display unit main. The screen image is displayed in the aspect ratio (e.g., length:width=3:4) corresponding to the horizontally oriented screen.

Figure 7:
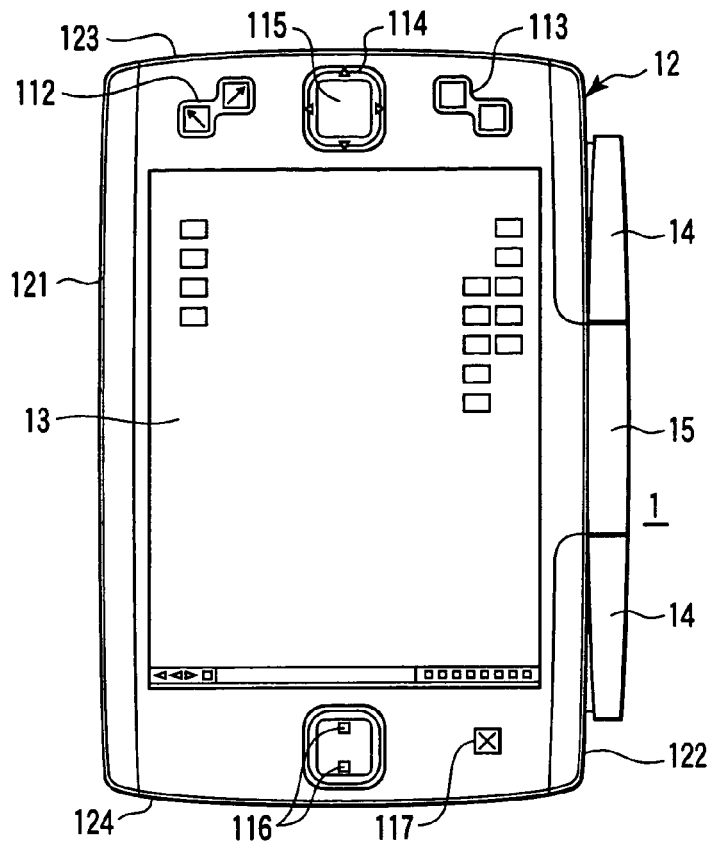
FIG. 7 is a top view of the information processing apparatus shown in FIG. 1, which turns 180 degrees in a PDA style.

FIG. 7 illustrates the computer 1 in which the right-end portion 123 of the display unit main body is located above and the left-end portion 124 thereof is located below relative to the force of gravity. A screen image rotates 180 degrees relative to the orientation of a default of the image in the PDA style such that the top-end portion of the screen image is located toward the right-end portion 123 of the display unit main body and the bottom-end portion of the screen image is located toward the left-end portion 124 of the display unit main body.

Figure 8:
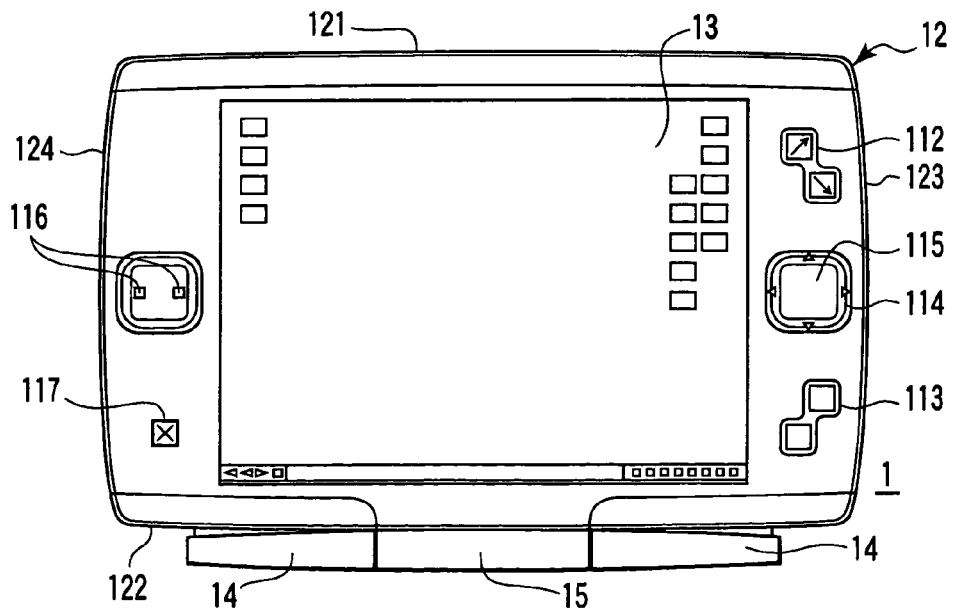
FIG. 8 is a top view of the information processing apparatus shown in FIG. 1, which turns 90 degrees to the left in a PDA style.

FIG. 8 illustrates the computer 1 in which the top-end portion 121 of the display unit main body is located above and the bottom-end portion 122 thereof is located below relative to the force of gravity. A screen image rotates 90 degrees to the right relative to the orientation of a default of the image in the PDA style such that the top-end portion of the screen image is located toward the top-end portion 121 of the display unit main body and the bottom-end portion of the screen image is located toward the bottom-end portion 122 of the display unit main body. The screen image is displayed in the aspect ratio (e.g., length:width=3:4) corresponding to the horizontally oriented screen.

While the computer 1 is operating in the PDA style, the automatic image rotating function is performed to sense which of the orientations shown in FIGS. 5 to 8 the computer 1 is located in relative to the force of the gravity and automatically change the orientation of an image such that it can correctly be aligned with that of the force of gravity in accordance with the results of the sensing.

The way to detect which of the PC style and the PDA style corresponds to the present style of the computer 1 will be described with reference to FIG. 9.

Figure 9:
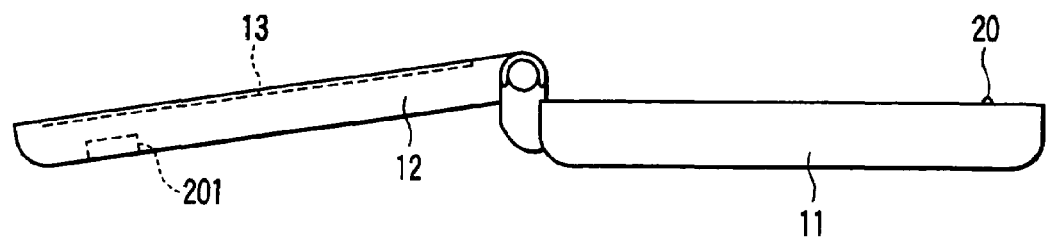
FIG. 9 is a sketch of a PDA-style sensing switch provided in the display unit of the information processing apparatus shown in FIG. 1.

FIG. 9 illustrates the display unit 12 that opens 180 degrees or more from the top surface of the computer main body 11 with regard to the first central axis 15a. The display unit 12 has a PDA style sensing switch 201 on its rear surface. The PDA style sensing switch 201 is a mechanical switch for detecting which of the PC style and the PDA style corresponds to the present style of the computer 1. When the rear surface of the display unit 12 is placed on the top surface of the computer main body 11, the PDA style sensing switch 201 contacts a projection 20 formed on the top surface of the computer main body 11 and thus turns on. When the switch 201 turns on, it outputs a sensing signal of logic level "1" indicating that the present style of the computer 1 is a PDA style. When the switch 201 turns off, it outputs a sensing signal of logic level "0" indicating that the present style of the computer 1 is a PC style.

Figure 10:
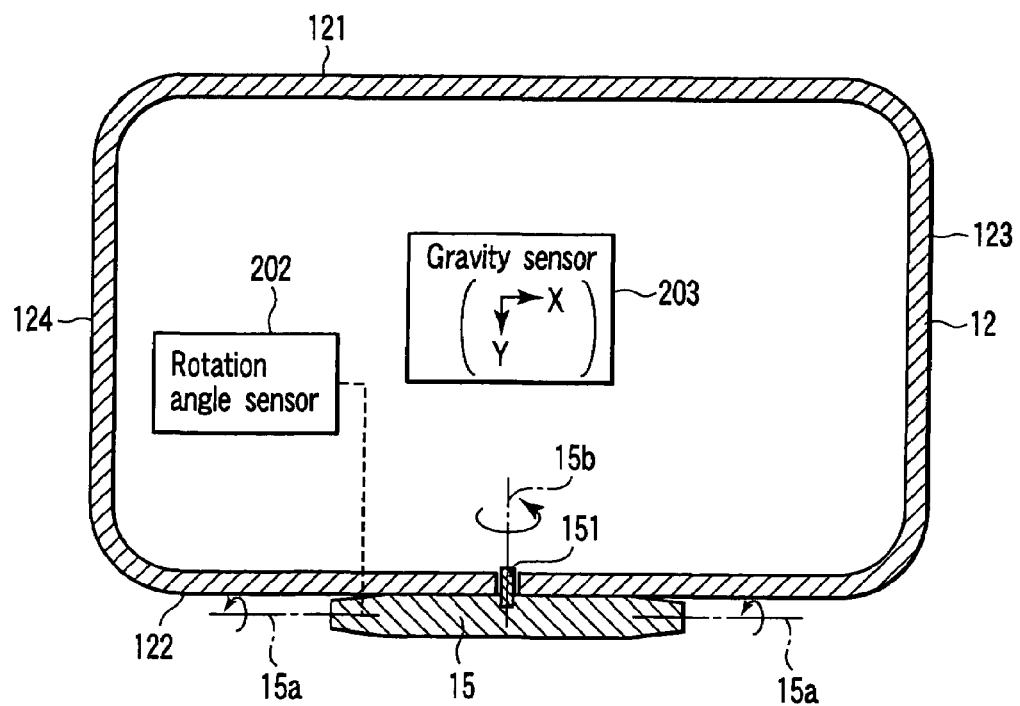
FIG. 10 is a sketch of two sensors provided in the display unit of the information processing apparatus shown in FIG. 1.

Referring to FIG. 10, the main body of the display unit 12 is supported by the support member 15 such that it can be rotated on the second central axis 15b by a shaft 151 protruded from the support member 15. The display unit main body contains a rotation angle sensor 202 and a gravity sensor 203. The rotation angle sensor 202 senses whether an angle formed between the front surface of the display unit 12 and the top surface of the computer main body 11 is greater than a specific angle by the rotation angle of the support member 15 that rotates around the first central axis 15a. For example, the sensor 202 senses whether or not the angle is 180 degrees or greater. The sensor 202 can be provided in the computer main body 11. Also, the sensor 202 can be replaced with a mechanical switch that is turned on by a projection formed on the support member 15 when the display unit 12 rotates on the first central axis 15a and opens 180 degrees or more from the top surface of the computer main body 11.

The gravity sensor 203 is a sensor for sensing which orientation the display unit main body is located in relative to the orientation of the force of gravity. For example, the sensor 203 is implemented as a gradient sensor for sensing the gradient of the display unit main body in two-dimensional directions X and Y. The gravity sensor 203 senses the gradient in the direction X to output a sensing signal (X) indicative of which of the right-end portion 123 and left-end portion 124 of the display unit 12 is located below relative to the force of gravity. The gravity sensor 203 senses the gradient in the direction Y to output a sensing signal (Y) indicative of which of the top-end portion 121 and bottom-end portion 122 of the display unit 12 is located below relative to the force of gravity. The gravity sensor 203 thus senses which of the orientations shown in FIGS. 5 to 8 the computer 1 is located in relative to the force of gravity.

The gravity sensor 203 can also sense whether or not an angle formed between the front surface of the display unit 12 and the top surface of the computer main body 11 is 180 degrees or greater. When the angle exceeds 180 degrees, the gravity sensor 203 senses that the top-end portion 121 of the display unit 12 is located lower than the bottom-end portion 122 thereof relative to the force of gravity.

However, the orientation of the display unit 12 is unstable relative to the force of gravity when a user holds the computer 1 with hands. It is thus desirable to use the rotation angle sensor 202 made up of mechanical switches and the like in order to sense an angle formed between the front surface of the display unit 12 and the top surface of the computer main body 11.

A system configuration of the computer 1 will be described with reference to FIG. 13.

Figure 13:
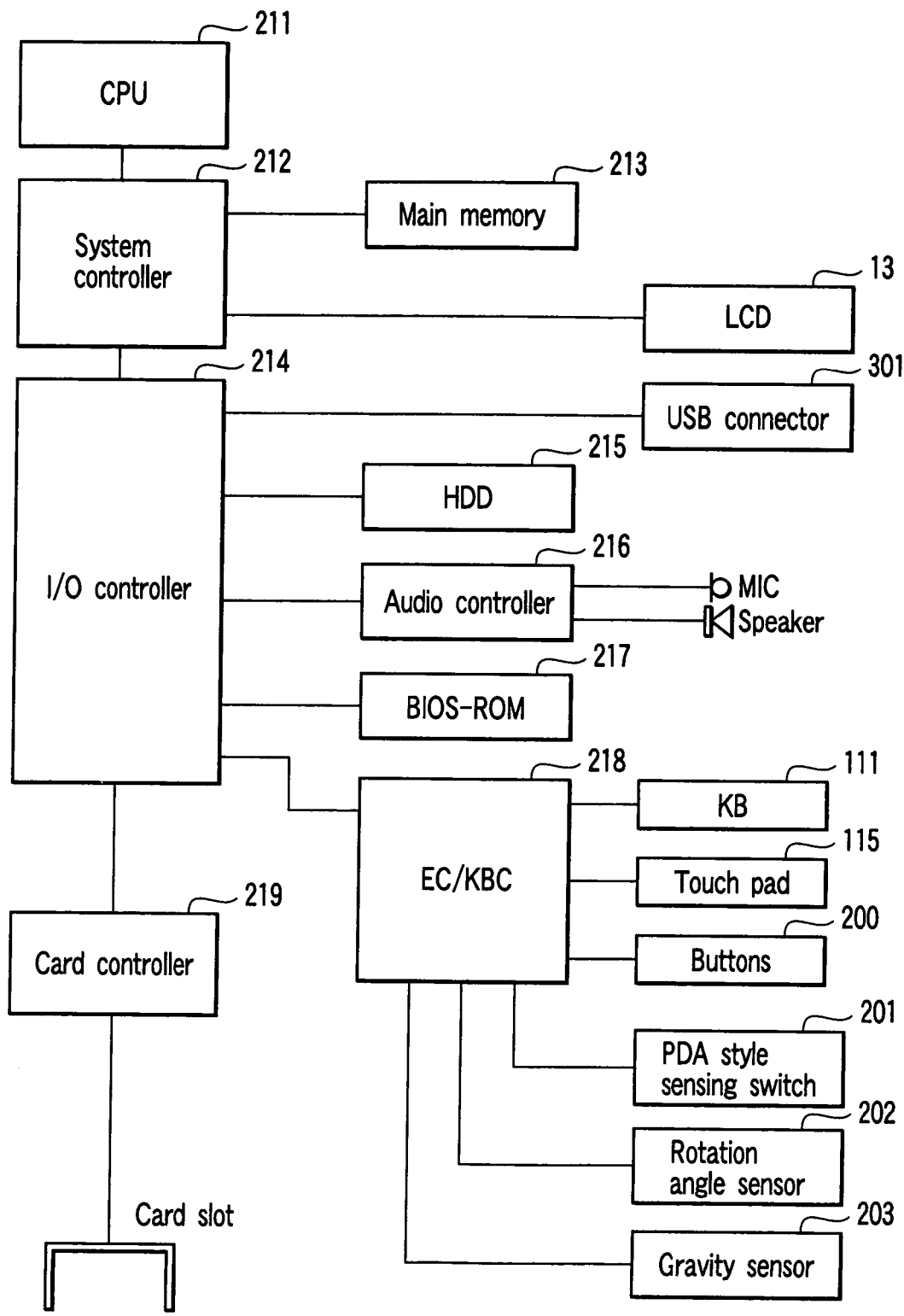
FIG. 13 is a block diagram showing a system configuration of the information processing apparatus shown in FIG. 1.

The computer main body 11 includes a CPU 211, a system controller 212, a main memory 213, an I/O controller 214, a hard disk drive (HDD) 215, an audio controller 216, a BIOS-ROM 217, an embedded controller/keyboard controller IC (EC/KBC) 218, and a card controller 219, as illustrated in FIG. 13.

The CPU 211 is a processor for controlling an operation of the computer 1 and executes various application programs and an operating system which are loaded into the main memory 213 from the HDD 215. The CPU 211 also executes a BIOS (Basic Input Output System) stored in the BIOS-ROM 217. The BIOS is a program for controlling hardware that makes up the computer 1. The BIOS has a function of controlling an automatic image rotating function.

The system controller 212 is a bridge device to connect the CPU 211 and I/O controller 214 and includes a memory controller for controlling the main memory 213 and a display controller for controlling the LCD 13. The I/O controller 214 performs communications with respective devices connected to the I/O controller 214 under the control of the CPU 211. The I/O controller 214 includes a USB (Universal Serial Bus) host controller. The USB host controller controls a USB device connected to a USB connector provided on the computer main body 11.

The audio controller 216 carries out a voice input operation for inputting a voice signal through a microphone and an audio playback operation for outputting an audio signal from a speaker under the control of the CPU 211. The EC/KBC 218 includes a one-chip microcomputer and is connected to the keyboard 111, touch pad 115 and button group 200 to sense their operations. The button group 200 includes the foregoing key switches 112, 113, 114, 116, 117, 118 and 119. The EC/KBC 218 is electrically connected to the PDA style sensing switch 201, rotation angle sensor 202 and gravity sensor 203.

Under the control of the CPU 211, the card controller 219 controls various cards such as a memory card and a communication card, which are inserted into a card slot provided in the computer main body 11.

A description of how the BIOS controls the automatic image rotating function will be made with reference to FIG. 14.

The BIOS 301 acquires the values of output signals of the PDA style sensing switch 201, rotation angle sensor 202, gravity sensor 203 and inhibit switch 117 via the EC/KBC 218, by polling a register in the EC/KBC 218 or by using of interrupt signal from the EC/KBC 218 to CPU 211.

When the computer 1 is used in the PC style, the BIOS 301 performs control to change the orientation of a screen image in response to a signal from the rotation angle sensor 202. When the computer 1 is used in the PDA style, the BIOS 301 performs control to change the orientation of a screen image in response to a signal from the gravity sensor 203. The BIOS 301 informs a display driver 303 of the orientation of the screen image to be displayed on the LCD 13 and the aspect ratio of the screen image through an operating system (OS) 302. The display driver 303 performs an operation for rotating a screen image displayed on the LCD 13 and a scaling operation for varying the aspect ratio in response to an instruction from the BIOS 301.

Figure 14:
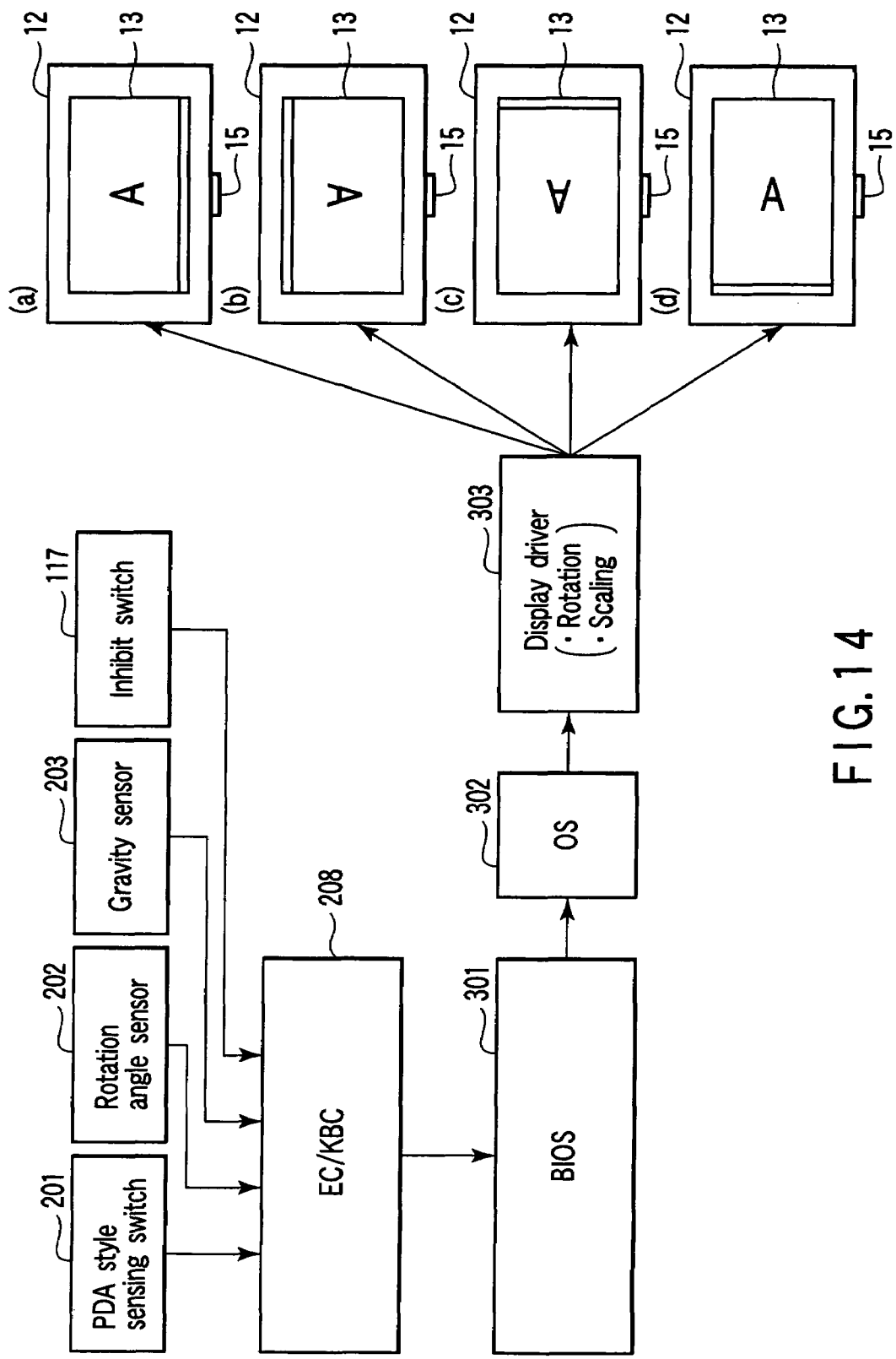
FIG. 14 is an illustration of a control operation for an automatic image rotating function performed by the information processing apparatus shown in FIG. 1.

The display driver 303 sets the orientation of the screen image displayed on the LCD 13 in any one of four orientations (a), (b), (c) and (d) shown in FIG. 14 in response to an instruction from the BIOS 301.

Figure 15:
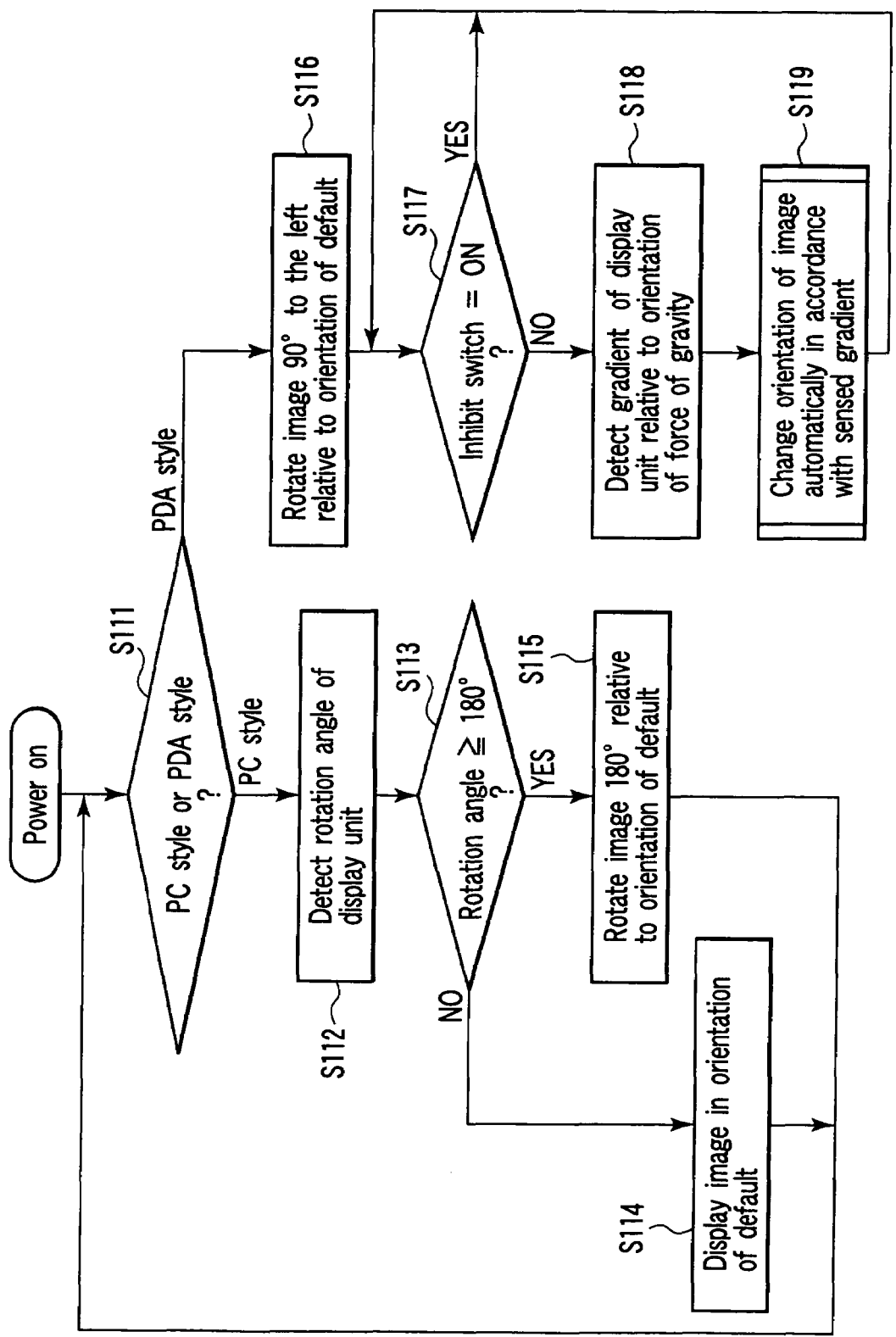
FIG. 15 is a flowchart showing an example of a procedure for an automatic image rotating function control operation carried out by the information processing apparatus shown in FIG. 1.

An operation of controlling the automatic image rotating function by the BIOS 301 will be described with reference to the flowchart shown in FIG. 15.

The BIOS 301 refers to a value of a sensing signal from the PDA style sensing switch 201 through the EC/KBC 218 to determine whether the display unit 12 is located in the first open position or the second open position. In other words, the BIOS 301 determines whether the computer 1 is used in the PC style or the PDA style (step S111).

If a value of the sensing signal from the switch 201 is "0," the BIOS 301 determines that the display unit 12 is located in the first open position or the computer 1 is used in the PC style. The BIOS 301 refers to a value of a sensing signal from the rotation angle sensor 202 through the EC/KBC 218 to determine whether an angle formed between the front surface of the display unit 12 on which the display screen of the LCD 13 is placed and the top surface of the computer main body 11 is greater than a specific angle that is predetermined. More specifically, the BIOS 301 determines whether or not the angle is 180 degrees or greater (step S113). If the angle is smaller than 180 degrees (NO in step S113), the BIOS 301 controls the display driver 303 such that the orientation of the screen image is set in that of a default (corresponding to (a) in FIG. 14) in the PC style (step S114). If the angle is 180 degrees or greater (YES in step S113), the BIOS 301 controls the display driver 303 to display the screen image in the orientation (corresponding to (b) in FIG. 14) in which the screen image rotates 180 degrees relative to the orientation of a default in the PC style (step S115).

The BIOS 301 periodically refers to a value of a sensing signal from the rotation angle sensor 202 via the EC/KBC 218. In the PC style, therefore, when an angle formed between the front surface of the display unit 12 and the top surface of the computer main body 11 changes from smaller than 180 degrees to not smaller than 180 degrees, the orientation of the screen image automatically changes from that of a default in the PC style to the orientation in which the screen image rotates 180 degrees relative to the orientation of the default. After that, when the angle changes from not smaller than 180 degrees to smaller than 180 degrees, the orientation of the screen image returns to that of the default in the PC style.

If a value of the sensing signal from the switch 201 is "1," the BIOS 301 determines that the display unit 12 is located in the second open position or the computer 1 is used in the PDA style. The BIOS 301 controls the display driver 303 to set the orientation of a screen image in that of a default (corresponding to (c) in FIG. 14) in the PDA style (step S116). Then, the BIOS 301 determines whether the inhibit switch 117 turns on through the EC/KBC 218. In other words, the BIOS 301 determines whether the inhibit switch 117 outputs an event signal indicative of inhibition of performance of the automatic rotating function (step S117).

If the inhibit switch 117 turns off or the automatic image rotating function is permitted to be performed (NO in step S117), the BIOS 301 refers to a gradient sensing signal (X,Y) from the gravity sensor 203 via the EC/KBC 218 and senses an orientation of the display unit 12 relative to the force of gravity (step S118). In accordance with the sensing result, the BIOS 301 performs an operation to change the orientation of the screen image automatically to be aligned with the force of gravity correctly (step S119). In step S119, the BIOS 301 determines whether the orientation of the display unit 12 is changed relative to the force of gravity. If the orientation is changed, the BIOS 301 controls the display driver 303 to align the orientation of the screen image with the force of gravity correctly. In the PDA style, therefore, the screen image is automatically set in one of four orientations (a) to (d) shown in FIG. 14.

While the inhibit switch 117 turns on or the automatic image rotating function is inhibited from being performed (YES in step S117), the BIOS 301 executes neither of steps S118 and S119. Thus, the orientation of the screen image is maintained in the orientation of a default set in step S116 or that set in step S119 immediately before the inhibit switch 117 turns on.

Consequently, according to the embodiment of the present invention, a screen image is rotated in conformity with each of the PC style and the PDA style.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
    a housing with a top surface;
    a keyboard placed on the top surface of the housing;
    a display unit with a front surface and a rear surface, supported by the housing and rotated between a closed position in which the keyboard is covered and an open position in which the keyboard is exposed;
    a placement position sensor which senses whether display unit is located in a position where the rear surface of the display unit covers the top surface of the housing and the front surface of the display unit is exposed;

an orientation sensor which senses an orientation of the display unit relative to force of gravity; and means for changing an orientation of the screen image displayed on a display device within the display unit in accordance with the orientation of the display unit relative to the force of gravity sensed by the orientation sensor when the placement position sensor senses that the rear surface of the display unit covers the top surface of the housing and the front surface of the display unit is exposed.

2. The information processing apparatus according to claim 1, further comprising a switch which issues an event signal to inhibit the orientation of the screen image from being changed.

3. The information processing apparatus according to claim 2, wherein the switch includes push button switch.

4. The information processing apparatus according to claim 1, wherein the display unit has a top-end portion, a bottom-end portion supported by the housing, a right-end portion, and a left-end portion, and the orientation sensor outputs a sensing signal indicative of which of the top-end portion of the display unit and the bottom-end portion thereof is located below relative to force of gravity and a sensing signal indicative of which of the right-end portion of the display unit and the left-end portion thereof is located below relative to the force of gravity.

5. The information processing apparatus according to claim 1, wherein the apparatus further comprises a switch which issues an event signal to inhibit the orientation of the screen image from being changed, and an orientation of the screen image formed immediately before the event signal is issued is maintained during issuance of the event signal.

6. An information processing apparatus comprising:

a housing with a top surface;

a keyboard placed on the top surface of the housing;

a display unit with a rear surface and a front surface in which a display screen is exposed, the display unit being supported by the housing and set in one of a first style which allows the display unit to rotate between a closed position in which the keyboard is covered and a first open position in which the display screen and the keyboard are exposed and a second style in which the rear surface covers the keyboard and the display screen is exposed;

an angle sensor which senses an angle formed between the display screen and the top surface of the housing;

an orientation sensor which senses an orientation of the display unit relative to force of gravity;

a placement position sensor which senses which of the first style and the second style the display unit is set in;

means for varying an orientation of a screen image displayed on the display screen between an orientation in which a bottom-end portion of the screen image is located toward the housing and an orientation in which a top-end portion of the screen image is located toward the housing in accordance with the angle sensed by the angle sensor when the placement position sensor senses that the display unit is set in the first style, and for varying the orientation of the screen image to locate the top-end portion of the screen image in a position higher than the bottom-end portion thereof relative to the force of gravity in accordance with the orientation of the display unit sensed by the orientation sensor when the placement position sensor senses that the display unit is set in the second style.

7. The information processing apparatus according to claim 6, wherein the display unit is supported by the housing rotatably around a first central axis that is parallel to the top surface of the housing and a second central axis that is perpendicular to the first central axis.

8. The information processing apparatus according to claim 6, further comprising a switch which issues an event signal to inhibit the screen image from varying in orientation when the display unit is set in the second style.

* * * * *